(12) United States Patent
Li

(10) Patent No.: US 8,570,894 B2
(45) Date of Patent: Oct. 29, 2013

(54) COMMUNICATION APPARATUS AND METHOD FOR REPORTING RECEPTION QUALITY

(75) Inventor: Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 197 days.

(21) Appl. No.: 13/142,376

(22) PCT Filed: Jan. 8, 2010

(86) PCT No.: PCT/JP2010/000100
§ 371 (c)(1),
(2), (4) Date: Jun. 27, 2011

(87) PCT Pub. No.: WO2010/092738
PCT Pub. Date: Aug. 19, 2010

(65) Prior Publication Data
US 2011/0267973 A1    Nov. 3, 2011

(30) Foreign Application Priority Data

Feb. 10, 2009   (JP) ................................. 2009-028432

(51) Int. Cl.
*H04L 12/26*    (2006.01)

(52) U.S. Cl.
CPC ..................................... *H04L 43/50* (2013.01)
USPC .......................................................... 370/252

(58) Field of Classification Search
USPC ........................................................ 370/252
See application file for complete search history.

(56) References Cited

U.S. PATENT DOCUMENTS

| | | | |
|---|---|---|---|
| 5,581,621 A | | 12/1996 | Koyama |
| 8,073,069 B2* | | 12/2011 | Mundarath et al. ........... 375/267 |
| 2008/0159214 A1* | | 7/2008 | Majonen et al. .............. 370/329 |

(Continued)

FOREIGN PATENT DOCUMENTS

EP    1 750 408    2/2007

(Continued)

OTHER PUBLICATIONS

Extended European Search Report dated Aug. 21, 2012.
International Search Report dated Apr. 13, 2010.
3GPP TSG RAN WG1 #47, "Analysis on DCT based CQI reporting Scheme (resubmission of R1-062954)," LG Electronics, R1-063174, Nov. 6-10, 2006, pp. 1-14.

(Continued)

*Primary Examiner* — Jason Mattis
*Assistant Examiner* — Stephen J Clawson
(74) *Attorney, Agent, or Firm* — Dickinson Wright PLLC

(57) ABSTRACT

A communication apparatus wherein in a case of reporting a reception quality measured for each of a plurality of subbands, even if the band is widened, the degradation in transmission efficiency can be avoided. In this apparatus, an antenna (101) receives the pilot signals superimposed on a plurality of subbands in a predetermined band. A quality level calculating unit (107) uses the received pilot signals to measure the reception qualities of the respective subbands. A CQI selecting unit (109) selects one of a plurality of CQI values that corresponds to one of the measured reception qualities for each subband. A feedback information generating unit (110) calculates a first average value of the selected CQI values, calculates a second average value of the CQI values indicating better reception qualities than the first average value, and calculates a difference value between the second average value and each of the CQI values indicating better reception qualities than the second average value. A transmitting unit (160) transmits, as feedback information, the first and second average values and the difference values to the other end of communication.

2 Claims, 7 Drawing Sheets

(56) References Cited

U.S. PATENT DOCUMENTS

| | | |
|---|---|---|
| 2008/0207135 A1* | 8/2008 | Varadarajan et al. ............ 455/69 |
| 2008/0227398 A1 | 9/2008 | Haghighat |
| 2009/0141648 A1 | 6/2009 | Imamura |
| 2009/0280749 A1 | 11/2009 | Tanno |
| 2010/0093287 A1 | 4/2010 | Higuchi |
| 2010/0110914 A1* | 5/2010 | Chun et al. .................... 370/252 |

FOREIGN PATENT DOCUMENTS

| | | |
|---|---|---|
| JP | 2006/287754 | 10/2006 |
| JP | 2007/020994 | 2/2007 |
| JP | 2007/288676 | 11/2007 |
| JP | 2008/125101 | 5/2008 |
| JP | 2008/236431 | 10/2008 |
| WO | 2007/123121 | 11/2007 |

* cited by examiner

| Index | MODULATION SCHEME | CODING RATE |
|---|---|---|
| 31 | NOT USED | |
| 30 | 64QAM | 5/6 |
| 29 | 64QAM | 3/4 |
| 28 | 64QAM | 2/3 |
| 27 | 64QAM | 1/2 |
| 26 | 64QAM | 1/3 |
| 25 | 16QAM | 5/6 |
| 24 | 16QAM | 3/4 |
| 23 | 16QAM | 2/3 |
| 22 | 16QAM | 1/2 |
| 21 | 16QAM | 1/3 |
| 20 | 8PSK | 5/6 |
| 19 | 8PSK | 3/4 |
| 18 | 8PSK | 2/3 |
| 17 | 8PSK | 1/2 |
| 16 | 8PSK | 1/3 |
| 15 | QPSK | 5/6 |
| 14 | QPSK | 3/4 |
| 13 | QPSK | 2/3 |
| 12 | QPSK | 1/2 |
| 11 | QPSK | 1/3 |
| 10 | QPSK | 5/6 |
| 9 | QPSK | 3/4 |
| 8 | QPSK | 2/3 |
| 7 | QPSK | 1/2 |
| 6 | QPSK | 1/3 |
| 5 | QPSK | 5/6 |
| 4 | QPSK | 3/4 |
| 3 | QPSK | 2/3 |
| 2 | QPSK | 1/2 |
| 1 | QPSK | 1/3 |
| 0 | COMMUNICATION IS NOT POSSIBLE | |

FIG.5

COMMUNICATION APPARATUS AND METHOD FOR REPORTING RECEPTION QUALITY

TECHNICAL FIELD

The present invention relates to a communication apparatus and a method of reporting reception quality. For example, the present invention relates to a communication apparatus and a method of reporting reception quality for transmitting a feedback of a channel quality indicator (CQI), which is a measurement result of reception quality of a downlink radio channel.

BACKGROUND ART

Conventionally, the mobile communication system is known where the result of measurement of reception quality state in a downlink channel is reported as a CQI from a communication terminal apparatus such as a mobile phone to a base station, to perform link adaptation for a downlink channel (for example, transmission power control, adaptive modulation, and adaptive demodulation) or scheduling of packets to transmit to each user (for example, see Patent Literature 1). Here, although a CQI is equivalent to Ec/I0 of the common pilot channel (ratio of received chip energy to interference power), according to the present application, a CQI is not limited to Ec/I0, and also refers to an indicator or feedback information that show the reception quality state of radio channel such as propagation loss, reception power, and the ratio of signal to interference power.

Further, conventionally, because frequency-selective fading occurs following the trend of broadbandization in a mobile communication system, a mobile communication system for efficiently transmitting data is known where each of a plurality of users use a different frequency band having a good condition. According to this mobile communication system, the whole frequency band to use is divided into a plurality of sub-bands, and a CQI is measured and reported per sub-band.

Further, in recent years, in the digital radio communication system, high speed transmission has started gaining popularity. Further, in the future mobile communication system, further broadbandization is expected to realize high transmission rate, short delay, and large capacity.

CITATION LIST

Patent Literature

PTL 1
Japanese Patent Application Laid-Open No. 2008-236431

SUMMARY OF INVENTION

Technical Problem

However, the conventional mobile communication system has a problem that, in accordance with the trend of the broadbandization, the amount of information required for the report of CQIs increases and the amount of information about positional information of sub-bands increases, lowering the transmission efficiency.

It is therefore an object of the present invention to provide a communication apparatus and a method of reporting reception quality for making it possible to suppress a decrease in transmission efficiency even when the band is broadened when reporting reception quality that is measured per sub-band.

Solution to Problem

A communication apparatus according to the present invention comprises a reception section that receives a known signal that is superimposed on a plurality of sub-bands in a predetermined band; a reception quality measurement section that measures reception quality per sub-band based on the received known signal; a selection section that selects, from a plurality of report values, a report value corresponding to the measured reception quality, per sub-band; a calculation section that calculates a first average value of the selected report values and calculates a second average value of the selected report values that show better reception quality than the first average value, and calculates difference values between the second average value and the selected report values that show better reception quality than the second average value; and a transmission section that transmits the first average value, the second average value, and the difference values to a communicating party, as feedback information.

A method of reporting reception quality in a first communication apparatus for reporting reception quality from the first communication apparatus to a second communication apparatus according to the present invention, the method comprising the steps of receiving a known signal that is superimposed on a plurality of sub-bands in a predetermined band; measuring reception quality per sub-band based on the received known signal; selecting, from a plurality of report values, a report value corresponding to the measured reception quality, per sub-band; calculating a first average value of the selected report values and calculates a second average value of the selected report values that show better reception quality than the first average value, and calculates difference values between the second average value and the selected report values that show better reception quality than the second average value; and a transmission section that transmits the first average value, the second average value, and the difference values to the second communication apparatus, as feedback information.

Advantageous Effects of Invention

According to the present invention, it is possible to suppress a decrease in transmission efficiency even when the band is broadened when reporting reception quality that is measured per sub-band.

BRIEF DESCRIPTION OF DRAWINGS

FIG. 5 shows a CQI table according to Embodiment 1 of the present invention;

DESCRIPTION OF EMBODIMENTS

Now, embodiments of the present invention will be described in detail with reference to the accompanying drawings.

Embodiment 1

Figure 1:
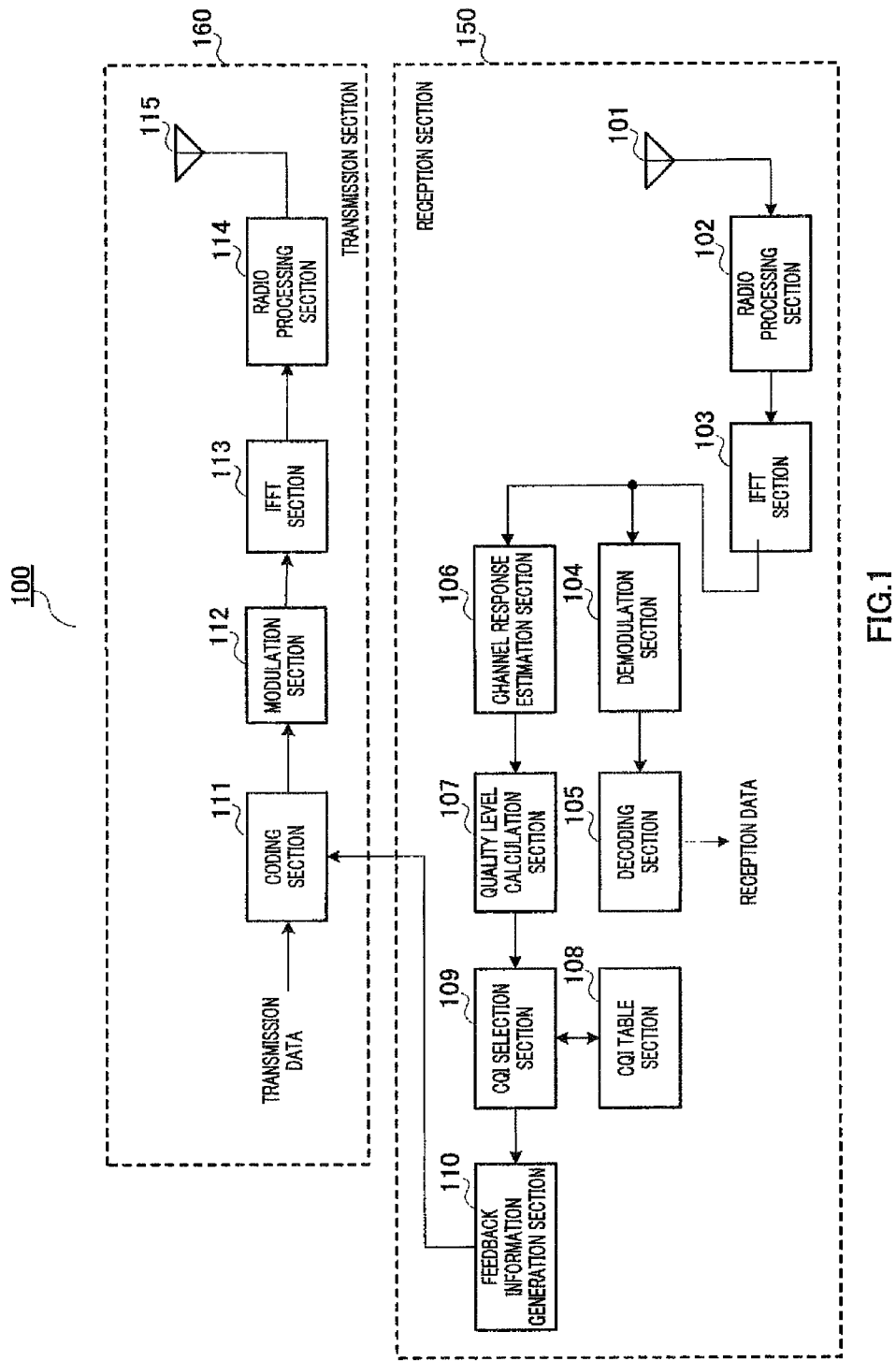
FIG. 1 is a block diagram showing a configuration of a communication apparatus according to Embodiment 1 of the present invention.

FIG. 1 is a block diagram showing a configuration of communication apparatus 100 according to Embodiment 1 of the present invention. Examples of communication apparatus 100 include a communication terminal apparatus such as a mobile phone.

Communication apparatus 100 is configured mainly with reception section 150 and transmission section 160. Further, reception section 150 is configured mainly with antenna 101, radio processing section 102, fast Fourier transform (FFT) section 103, demodulation section 104, decoding section 105, channel response estimation section 106, quality level calculation section 107, CQI table section 108, CQI selection section 109, and feedback information generation section 110. Further, transmission section 160 is configured mainly with coding section 111, modulation section 112, inverse fast Fourier transform section (IFFT) section 113, radio processing section 114, and antenna 115. Each configuration will be described in detail below.

Antenna 101 receives a reception signal that is transmitted from a communicating party at, for example, a base station (not shown) and includes data superimposed on a plurality of sub-bands in a predetermined band and a pilot signal, a known signal, and outputs the reception signal to radio processing section 102.

Radio processing section 102 down-converts the reception signal input from antenna 101 from radio frequency into baseband frequency, and outputs the baseband frequency to FFT section 103.

FFT section 103 performs FFT on the reception signal input from radio processing section 102 to convert a frequency domain signal into a time domain signal. Further, FFT section 103 outputs data contained in the converted reception signal to demodulation section 104 and outputs the pilot signal to channel response estimation section 106.

Demodulation section 104 demodulates the data input from FFT section 103 and outputs a demodulated signal to decoding section 105.

Decoding section 105 decodes the demodulated signal input from demodulation section 104 and outputs the demodulated signal as reception data.

Channel response estimation section 106 estimates a channel response per sub-band based on the pilot signal input from FFT section 103. Then, channel response estimation section 106 outputs an estimation result to quality level calculation section 107.

Quality level calculation section 107 determines an average value of each sub-band based on the frequency response of the channel per sub-band that is the estimation result input from channel response estimation section 106, and outputs the average value to CQI selection section 109. For example, quality level calculation section 107 determines signal to noise plus interference ratio (SINR) as reception quality and determines the average SINR of each sub-band as the reception quality average value of each sub-band.

CQI table section 108 maintains a CQI table to which CQI indexes (Index: ID), reception qualities, and each parameter of coding scheme and coding rate, for example, are made correspond. The CQI table is maintained in read only memory (ROM). Here, a CQI index corresponds to a CQI value.

CQI selection section 109 looks up the CQI table maintained in CQI table section 108 to select a CQI index corresponding to the reception quality average value input from quality level calculation section 107, per sub-band. Specifically, CQI selection section 109 looks up the CQI table stored in CQI table section 108 to select the CQI index corresponding to the reception quality average value input from quality level calculation section 107, per sub-band. Then, CQI selection section 109 combines the selected CQI index and the CQI value (report value) and outputs the combined CQI index and CQI value to feedback information generation section 110.

Feedback information generation section 110 determines an average value of the CQI values for the whole band (hereinafter referred to as "first average value") using the CQI values of each sub-band in the whole band that are input from CQI selection section 109. Further, feedback information generation section 110 selects a sub-band having the CQI value that shows the better reception quality than the first average value out of the CQI values of each sub-band. Further, feedback information generation section 110 determines an average CQI value (hereinafter referred to as "second average value") using the CQI value of the selected sub-band. Further, feedback information generation section 110 selects a sub-band having a CQI value that shows the better reception quality than the determined second average value, and determines a difference value between the CQI value of the selected sub-band and the second average value. Then, feedback information generation section 110 outputs the determined first average value, second average value, and difference value to coding section 111 as feedback information. The specific method of generating feedback information will be described later.

Coding section 111 encodes a transmission signal including the feedback information and transmission data input from feedback information generation section 110, and outputs the coded signal to modulation section 112.

Modulation section 112 modulates the coded signal input from coding section 111 and outputs a modulated signal to IFFT section 113.

IFFT section 113 performs IFFT on the modulated signal input from modulation section 112 to convert a time domain signal to a frequency domain signal. Then, IFFT section 113 outputs the converted signal to radio processing section 114.

Radio processing section 114 up-converts the signal input from IFFT section 113, from the base band frequency into the radio frequency, and outputs the signal to antenna 115.

Antenna 115 transmits the signal input from radio processing section 114 to a communicating party such as a base station (not shown).

Figure 2:
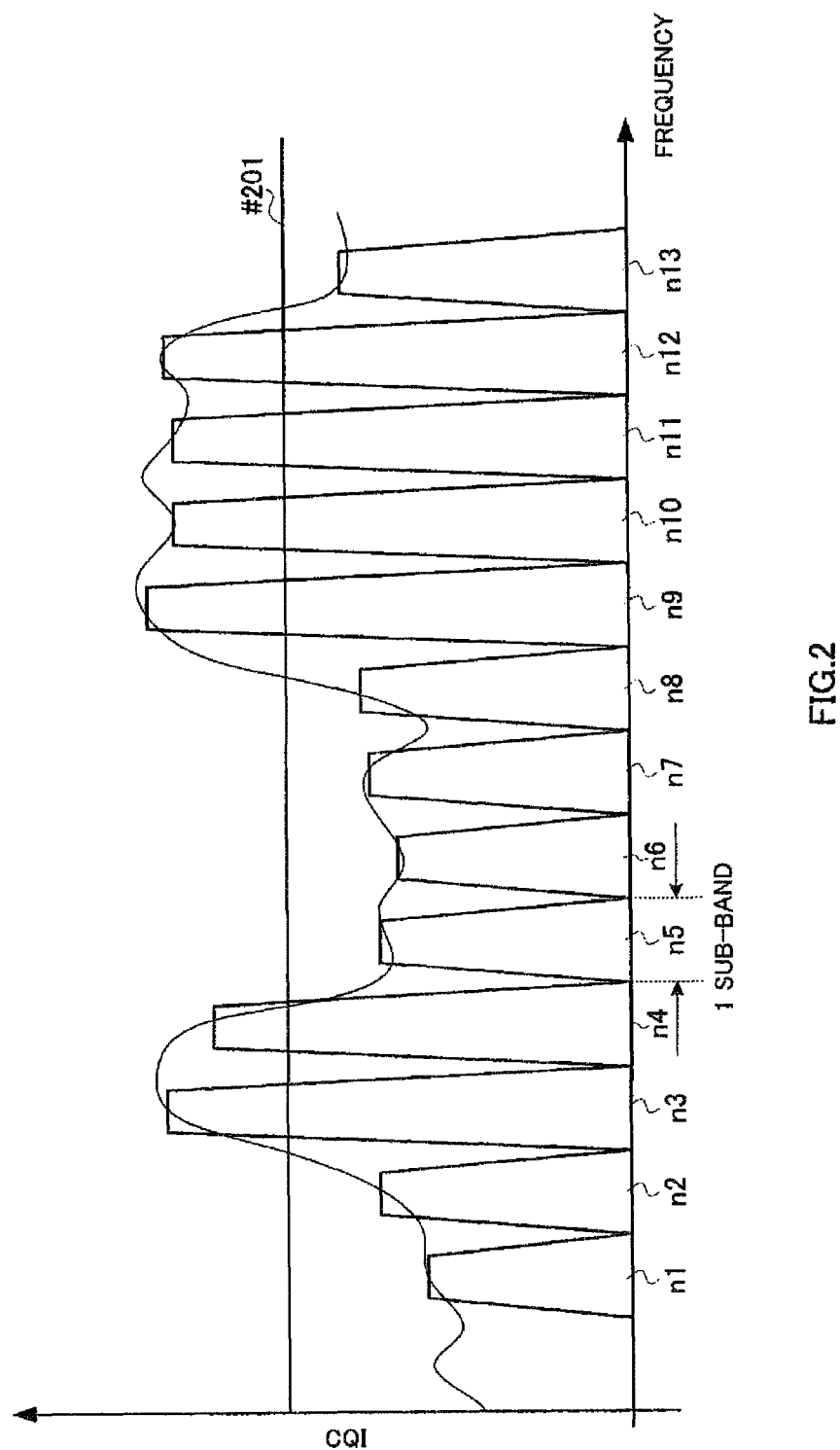
FIG. 2 shows a relationship between the first average value and the CQI values of each sub-band according to Embodiment 1 of the present invention.
Figure 3:
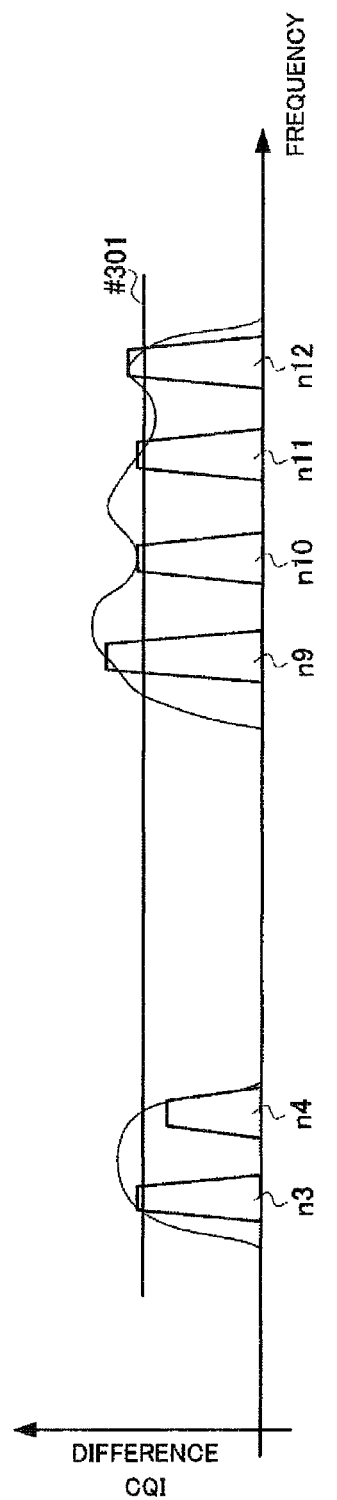
FIG. 3 shows a relationship between the second average value and the CQI values of each sub-band that show better reception quality than the first average value according to Embodiment 1 of the present invention.
Figure 4:
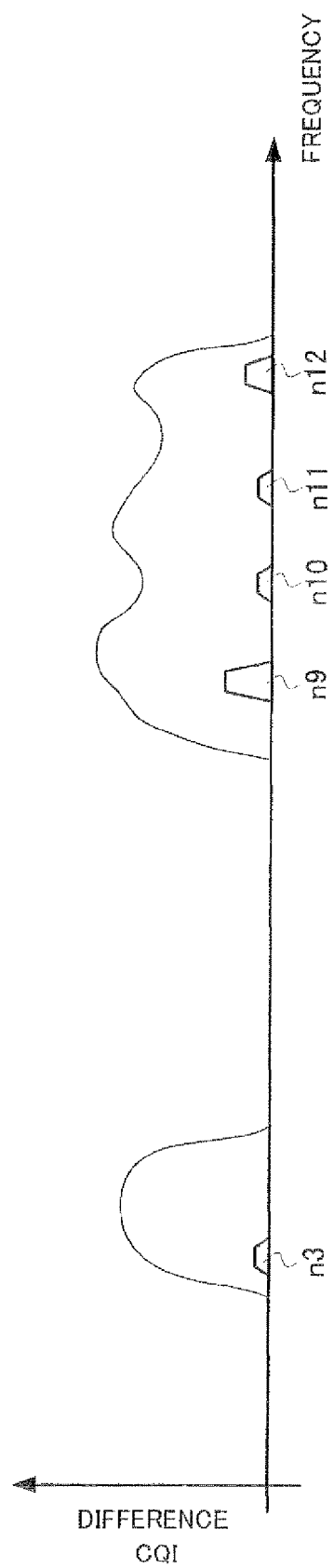
FIG. 4 shows difference values according to Embodiment 1 of the present invention.

Next, a method of generating feedback information will be described below using FIGS. 2 to 5. FIG. 2 shows a relationship between the first average value and the CQI values of each sub-band. FIG. 3 shows a relationship between the second average value and the CQI values of each sub-band that show better reception quality than the first average value. FIG. 4 shows difference values. FIG. 5 shows a CQI table. In FIG. 5, although the CQI table stores the reception quality that is associate with the CQI index, the description will be omitted.

First, feedback information generation section 110 determines first average value #201 of the CQI values in the whole band. That is, first average value #201 is obtained by adding CQI values of sub-bands in the whole band including sub-bands n1 to n13 to determine a sum value and dividing the sum value by the number of sub-bands in the whole band (see FIG. 2).

Further, feedback information generation section 110 selects sub-bands having a CQI value that shows better reception quality than first average value #201, that is, sub-bands having a greater CQI value than first average value #201. In FIG. 2, feedback generation section 110 selects six sub-bands, n3, n4, n9, n10, n11, and n12, having a greater CQI value than first average value #201 (see FIG. 2).

Further, feedback information generation section 110 determines second average value #301 that is the average value of each CQI value of selected sub-bands n3, n4, n9, n10, n11, and n12. That is, second average value #301 can be determined by adding the CQI values of sub-bands n3, n4, n9, n10, n11, and n12 to obtain a sum value, and dividing the obtained sum value by the number of sub-bands of 6 (see FIG. 3).

Further, feedback information generation section 110 selects the sub-bands having a CQI value that shows better reception quality than second average value #301, that is, sub-bands n3, n9, n10, n11, and n12, having a greater CQI value than second average value #301 (see FIG. 3).

Further, feedback information generation section 110 determines a difference value between the CQI values of selected sub-bands n3, n9, n10, n11, and n12 and second average value #301 (see FIG. 4). That is, the difference value can be determined by subtracting second average value #301 from each CQI value of sub-bands n3, n9, n10, n11, and n12.

Here, in feedback information, five bits are allocated to first average value #201. Further, by allocating five bits to first average value #201, it is possible to specify first average value #201 from one of the 32 types of CQI values corresponding to CQI indexes 0 to 31 (see FIG. 5).

Further, in feedback information, two bits are allocated to second average value #301. Further, by allocating only 2 bits to second average value #301, which is smaller than first average value #201, second average value #301 needs to be specified based on one CQI value from four types of CQI values out of CQI indexes 0 to 31. However, because the CQI value that is used to determine second average value #301 is a CQI value that shows better reception quality than first average value #201, it is possible to specify second average value #301 based on four types of CQI values.

Further, in feedback information, one bit is allocated to the difference value per sub-band. Further, by allocating only one bit to the difference value, which is smaller than first average value #201 and second average value #301, the difference value needs to be specified based on one CQI value from two types of CQI values out of CQI indexes 0 to 31. However, because the difference value is a difference between second average value #301 and a CQI value that shows better reception quality than second average value #301, it is possible to specify the difference value based on two types of CQI values.

As described above, feedback information generation section 110 generates first average value #201 of five bits, second average value #301 of two bits, and a one-bit difference per sub-band wherein the difference value is calculated, as feedback information. In the case of FIGS. 2 to 4, feedback information generation section 110 generates feedback information of 12 bits, from "first average value #201 (five bits)+second average value #301 (two bits)+the difference value (one bit)×the number of sub-bands wherein the difference value are calculated=12 bits." Further, feedback information includes positional information of the sub-bands wherein the difference value are calculated.

As described above, according to the present embodiment, only by reporting the first average value and the second average value to a communicating party and allocating only an amount of information of one bit, per sub-band, to a difference value, which needs to be transmitted for the number of sub-bands, it is possible to suppress the amount of feedback information, suppressing a decrease in transmission efficiency even when the band is broadened.

Further, although a case has been described with the present embodiment where feedback information is formed with the first average value, the second average value, and the difference value, the present embodiment is by no means limited to this, and feedback information may include other parameters as long as at least the first average value, the second average value, and the difference value are included. Further, although a case has been described with the present embodiment where five bits are allocated to the first average value, two bits are allocated to the second average value, and one bit is allocated to the difference value, the present embodiment is by no means limited to this, and it is equally possible to allocate an arbitrary number of bits to the first average value, the second average value, and the difference value.

Embodiment 2

Figure 6:
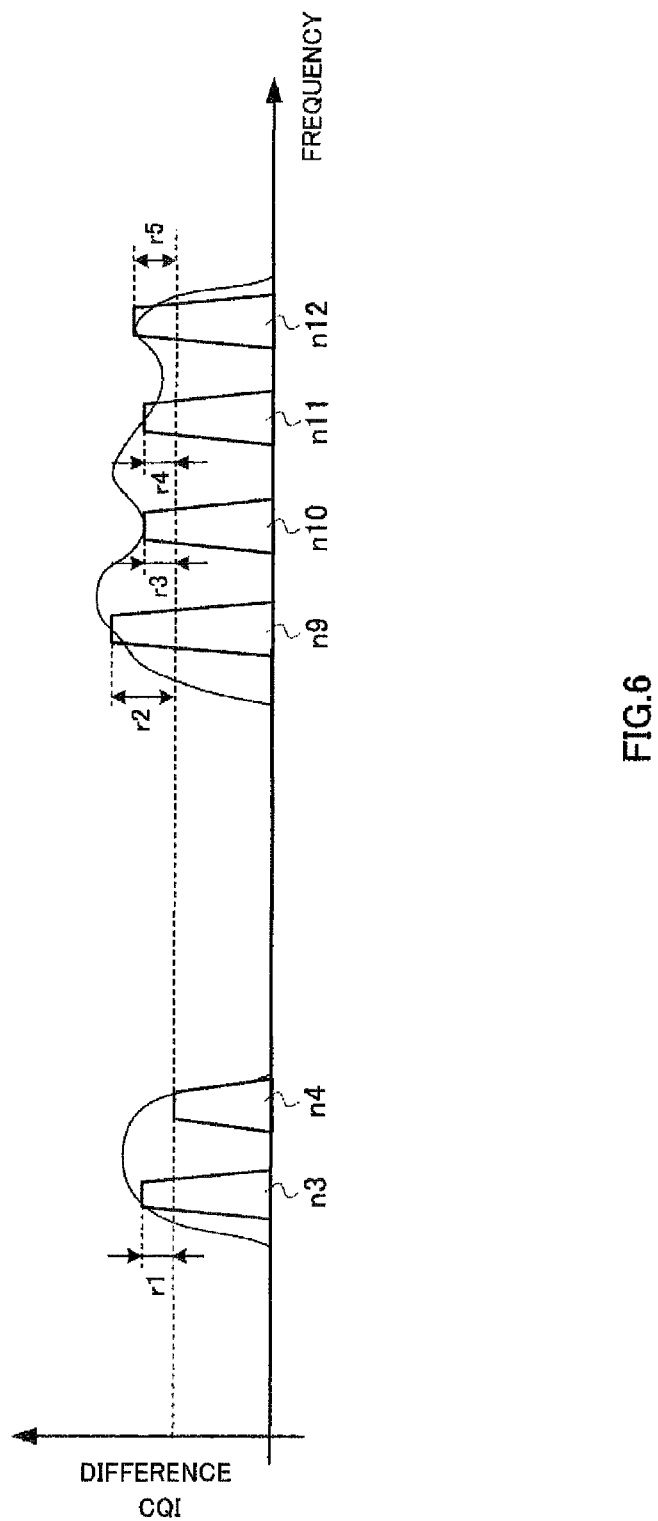
FIG. 6 shows the CQI values of each sub-hand that show better reception quality than the first average value according to Embodiment 2 of the present invention.
Figure 7:
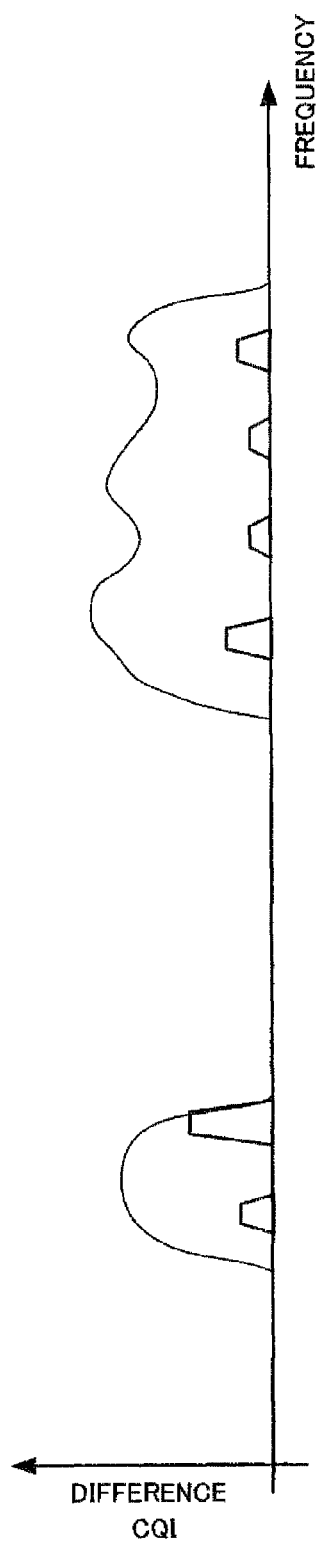
FIG. 7 shows difference values according to Embodiment 2 of the present invention.

FIG. 6 shows the CQI values of each sub-band that show better reception quality than the first average value. Further, FIG. 7 shows difference values.

The communication apparatus according to the present embodiment is configured with the same functions as FIG. 1 and is different only in processing in feedback information generation section 110 from the above Embodiment 1, and therefore the overlapping explanations for the functions of the communication apparatus will be omitted. Further, in the explanation for the present embodiment below, the same reference numerals as in FIG. 1 will be used.

A method of generating feedback information according to the present embodiment will be described below using FIGS. 6 and 7. Further, the present embodiment is the same as Embodiment 1 up to the selection of sub-bands using the first average value, FIG. 2 will be used for the explanation. Further, according to the present Embodiment, the CQI table in FIG. 5 is used.

First, feedback information generation section 110 determines first average value #201 of CQI values for the whole band. That is, first average value #201 can be determined by adding the CQI values of sub-bands in the whole band including sub-bands n1 to n13 to determine a sum value, and dividing the determined sum value by the number of sub-bands in the whole band (see FIG. 2).

Further, feedback information generation section 110 selects sub-bands having a CQI value that shows the better reception quality than first average value #201, that is, sub-bands having a greater CQI value than first average value #201. In FIG. 2, feedback information generation section 110 selects six sub-bands n3, n4, n9, n10, n11, and n12, having a CQI value that shows better reception quality than first average value #201 (see FIG. 2).

Further, feedback information generation section 110 selects the smallest CQI value out of the CQI values of selected sub-bands n3, n4, n9, n10, n11, and n12. In the case of FIG. 2, because the CQI value of sub-band n4 is the smallest, feedback information generation section 110 selects the CQI value of sub-band n4 as the smallest CQI.

Further, feedback information generation section 110 determines difference values of from r1 to r5 between the smallest CQI and the CQI values of each sub-band n3, n9, n10, n11, and n12 excluding sub-band n4 (see FIG. 6). That is, the difference values of from r1 to r5 can be determined by subtracting the smallest CQI from the CQI values of each sub-band n3, n9, n10, n11, and n12 excluding sub-band n4.

Here, in feedback information, five bits are allocated to first average value #201. Further, by allocating five bits to first average value #201, it is possible to specify first average value #201 from one of the 32 types of CQI values corresponding to CQI indexes 0 to 31 (see FIG. 5).

Further, in feedback information, two bits are allocated to the smallest CQI. Further, by allocating only two bits to the smallest CQI, which is fewer than to first average value #201, the smallest CQI needs to be specified based on one CQI value from four types of CQI values out of CQI indexes 0 to 31. However, because the CQI values that are used to determine the smallest CQI are CQI values that show better reception quality than first average value #201, it is possible to specify the smallest CQI from four types of CQI values.

Further, in feedback information, one bit is allocated to the difference value per sub-band. Further, by allocating only one bit to the difference value, which is smaller than first average value #201 and the smallest CQI, the difference value needs to be specified based on one CQI value from two types of CQI values out of CQI indexes 0 to 31. However, because the difference value is a difference between the smallest CQI value that shows better reception quality than first average value #201 and the CQI value that shows better reception quality than first average value #201 excluding the smallest CQI value, it is possible to specify the difference value from two types of CQI values.

As described above, feedback information generation section 110 generates first average value #201 of five bits, the smallest CQI of two bits, and the difference value of one bit per sub-band wherein the difference value is calculated, as feedback information. For example, feedback information generation section 110 generates feedback information of 12 bits, from "first average value #201 (five bits)+the smallest CQI (two bits)+the difference value (one bit)×the number of sub-bands wherein the difference value is calculated=12 bits." Further, feedback information includes positional information of the sub-bands wherein the difference value is calculated.

As described above, according to the present embodiment, only by reporting the first average value and the smallest CQI to a communicating party and allocating only an amount of information of one bit, per sub-band, to a difference value, which needs to be transmitted for the number of sub-bands, it is possible to suppress the amount of feedback information, suppressing a decrease in transmission efficiency even when the band is broadened.

Further, although a case has been described with the present embodiment where feedback information is formed with the first average value, the smallest CQI, and the difference value, the present embodiment is by no means limited to this, and feedback information may include other parameters as long as at least the first average value, the smallest CQI, and the difference value are included. Further, although a case has been described with the present embodiment where five bits are allocated to the first average value, two bits are allocated to the smallest CQI, and one bit is allocated to the difference value, the present embodiment is by no means limited to this, and it is equally possible to allocate an arbitrary number of hits to the first average value, the smallest CQI, and the difference value.

Although cases have been described with the above Embodiments 1 and 2 where reception quality is reported using the CQI, the present invention is by no means limited to this, and it is equally possible to report reception quality using arbitrary parameters other than the CQI as long as the parameter indicates reception quality. Further, although cases have been described with the above Embodiment 1 and 2 where reception quality is measured using a pilot signal, the present invention is by no means limited to this, and it is equally possible to measure reception quality using a known arbitrary signal.

The disclosure of Japanese Patent Application No. 2009-28432 filed on Feb. 10, 2009, including the specification, drawings, and abstract, is incorporated herein by reference in its entirety.

INDUSTRIAL APPLICABILITY

A communication apparatus and a method of reporting reception quality according to the present invention is suitable, for example, to send a feedback of a CQI, which is a measurement result of reception quality of a downlink radio channel.

The invention claimed is:

1. A method of reporting reception quality in a first communication apparatus for reporting reception quality from the first communication apparatus to a second communication apparatus, the method comprising the steps of:
   receiving a known signal that is superimposed on a plurality of sub-bands in a predetermined band;
   measuring reception quality per sub-band based on the received known signal;
   selecting, from a plurality of report values, a report value corresponding to the measured reception quality, per sub-band;
   calculating, using a processor, a first average value of the selected report values and calculates a second average value of the selected report values that show better reception quality than the first average value, and calculates difference values between the second average value and the selected report values that show better reception quality than the second average value; and
   a transmission section that transmits the first average value, the second average value, and the difference values to the second communication apparatus, as feedback information used for performing link adaptation or scheduling of packets.

2. A communication apparatus comprising:
   a receiver that receives a known signal that is superimposed on a plurality of sub-bands in a predetermined band;
   a reception quality measurer that measures reception quality per sub-band based on the received known signal;
   a selector that selects, from a plurality of report values, a report value corresponding to the measured reception quality, per sub-band;
   a calculator that calculates a first average value of the selected report values and calculates a second average value of the selected report values that show better reception quality than the first average value, and calculates difference values between the second average value and the selected report values that show better reception quality than the second average value; and
   a transmitter that transmits the first average value, the second average value, and the difference values to a communicating party, as feedback information used for performing link adaptation or scheduling of packets.

* * * * *